United States Patent
Martins Loureiro et al.

(10) Patent No.: US 7,879,284 B2
(45) Date of Patent: Feb. 1, 2011

(54) METHOD FOR MAKING SINTERED CUBIC HALIDE SCINTILLATOR MATERIAL

(75) Inventors: Sergio Paulo Martins Loureiro, Saratoga Springs, NY (US); Venkat Subramaniam Venkataramani, Clifton Park, NY (US); Lucas Clarke, Brussels (BE); Kevin P. McEvoy, Ballston Spa, NY (US); Carl Joshua Vess, Latham, NY (US); Thomas McNulty, Ballston Lake, NY (US); Steven Jude Duclos, Clifton Park, NY (US); Adrian Ivan, Niskayuna, NY (US); Patricia A. Hubbard, Olmsted Falls, OH (US)

(73) Assignee: Momentive Performance Materials Inc., Albany, NY (US)

(*) Notice: Subject to any disclaimer, the term of this patent is extended or adjusted under 35 U.S.C. 154(b) by 564 days.

(21) Appl. No.: 11/699,140

(22) Filed: Jan. 29, 2007

(65) Prior Publication Data
US 2007/0237668 A1 Oct. 11, 2007

Related U.S. Application Data

(60) Provisional application No. 60/763,249, filed on Jan. 30, 2006.

(51) Int. Cl.
 B29C 67/04 (2006.01)
 B28B 3/00 (2006.01)
 C04B 35/645 (2006.01)
(52) U.S. Cl. .................. 264/667; 250/370.11; 264/319; 264/332; 264/125

(58) Field of Classification Search ................. 264/123, 264/125, 667; 250/370.11
See application file for complete search history.

(56) References Cited

U.S. PATENT DOCUMENTS 3,359,066 A * 12/1967 Hatch et al. ................. 423/490
3,960,756 A 6/1976 Noakes (Continued)

FOREIGN PATENT DOCUMENTS

GB 792071 3/1958

(Continued)

OTHER PUBLICATIONS

Richerson, David W. Modern Ceramic Engineering. New York, Marcel Dekker, 1992. p. 379-381.*

(Continued)

Primary Examiner—Matthew J Daniels
Assistant Examiner—Eric Snelting
(74) Attorney, Agent, or Firm—Joseph E. Waters (57) ABSTRACT

A method of making a cubic halide scintillator material includes pressing a powder mixture of cubic halide and at least one activator under conditions of pressure, temperature, residence time and particle size effective to provide a polycrystalline sintered cubic halide scintillator having a pulse height resolution of from about 7% to about 20%. The conditions include a temperature ranging from about ambient temperature up to about 90% of the melting point of the cubic halide, a pressure of from about 30,000 psi to about 200,000 psi, a pressing residence time of from about 5 minutes to about 120 minutes and an average cubic halide particle size of from about 60 micrometers to about 275 micrometers.

20 Claims, 7 Drawing Sheets

U.S. PATENT DOCUMENTS

| | | | | |
|---|---|---|---|---|
| 4,242,221 | A | * 12/1980 | Cusano et al. | 264/1.21 |
| 5,025,151 | A | 6/1991 | Melcher | |
| 5,116,560 | A | * 5/1992 | Dole et al. | 264/1.22 |
| 5,178,719 | A | 1/1993 | Pandelisev | |
| 5,319,203 | A | 6/1994 | Anderson et al. | |
| 5,900,060 | A | 5/1999 | Nause et al. | |
| 6,077,775 | A | 6/2000 | Stumborg et al. | |
| 6,224,666 | B1 | 5/2001 | Zwolinski et al. | |
| 6,323,489 | B1 | 11/2001 | McClellan | |
| 6,383,446 | B1 | * 5/2002 | Tokita | 419/38 |
| 6,706,212 | B2 | 3/2004 | Venkataramani et al. | |
| 6,881,960 | B2 | 4/2005 | Schreiner et al. | |
| 6,909,097 | B2 | 6/2005 | Schreiner et al. | |
| 7,084,403 | B2 | 8/2006 | Srivastava et al. | |
| 7,141,794 | B2 | 11/2006 | Srivastava et al. | |
| 2004/0100000 | A1 | * 5/2004 | Kobusch et al. | 264/654 |
| 2006/0208197 | A1 | * 9/2006 | Hasegawa et al. | 250/370.11 |

FOREIGN PATENT DOCUMENTS

JP    548-9272    3/1973

OTHER PUBLICATIONS

Letters, Physical Review, vol. 97, No. 6, (Mar. 1955) p. 1714.
Saint Gobain Crystals, Measuring Radiation: An Introductory Discussion (Oct. 2004).

* cited by examiner

FIG. 1

Figure 2 – Sodium iodide sintered sample synthesized under conditions displayed in Example 1

Figure 3 – Sodium iodide sintered sample synthesized under conditions displayed in Example 2

Figure 4 – Sodium iodide sintered sample synthesized under conditions displayed in Example 3

Figure 5 – Sodium iodide sintered sample synthesized under conditions displayed in Example 4

Figure 6 – Sodium iodide sintered sample synthesized under conditions displayed in Example 5

Figure 7 – Sodium iodide sintered sample synthesized under conditions displayed in Example 6

METHOD FOR MAKING SINTERED CUBIC HALIDE SCINTILLATOR MATERIAL

CROSS-REFERENCE TO RELATED APPLICATIONS

This application claims priority to U.S. provisional application Ser. No. 60/763,249, filed Jan. 30, 2006, which is fully incorporated herein by reference.

FIELD OF THE INVENTION

The present invention relates to sintered cubic halide scintillation detectors such as sodium iodide scintillator materials, and methods for making thereof.

BACKGROUND OF THE INVENTION

Inorganic scintillation crystal detectors, such as thallium-doped sodium iodide (NaI:Tl) scintillators have been widely used in a number of applications ranging from medical, geological (such as well drilling), waste management, radiation detection in foodstuff including meat, fruit, vegetables, and homeland security. Nuclear medicine involves the detection of photons, such as gamma rays, emitted from a source, such as an internal organ of a patient which contains a dose of a radiopharmaceutical compound. A scintillation camera uses a sodium iodide scintillator as a detector to absorb incident gamma ray photons from the object under study and interacts with the absorbed gamma rays to produce light events. The scintillator converts the energy of the gamma photon into a flash of light detected by a photo-multiplier tube array which views the side of the scintillating crystal away from the patient. In deep well drilling for resources such as petroleum drilling, a large quantity of information relating to geological formations and conditions of the drilled well is required for analyses. NaI:Tl scintillators as a fast neutron source can be scattered and absorbed in the well bore environment producing gamma rays, thus obtaining the physical characteristics of the well bore environment.

Scintillation counting employing NaI:Tl crystals has also been used to quantify contaminants in waste sites containing radionuclide contamination in a rapid and efficient manner so as to establish remedial protocols. Gamma-spectrometers using NaI:Tl scintillators have been used to test terrestrial vegetation, soil, milk, grain, vegetables, game animal sampling, and even road kills such as deer to detect the presence of radionuclides. To counter threat to homeland security with the smuggling of radioactive materials including dirty bombs across borders or into public buildings and facilities, portable and/or hand-held radiation detectors have been increasingly put in use as part of a comprehensive security system in borders and countries for scanning packages, containers, automotives, shipments, etc. These devices record collisions between gamma rays or neutrons and scintillation detectors such as sodium iodide crystals, producing flashes of light picked up by a photomultiplier and registered by a counter.

Sodium iodide scintillators used in these applications include thallium activated sodium iodide crystals, a technology dating back to 1948. In the prior art technology, NaI crystals of large sizes are grown in either the Bridgman-Stockbarger method, the Czochralski method, or other single-crystal techniques. Some of these technologies have their roots going back to 1950's. However, all require the use of energy-intensive furnaces for growing the crystals, some with complex yield- and quality-critical control parameters such as temperature and thermal strain fields in the crystal, shape of growth interface, and convection patterns in the melt. There have been some publications disclosing methods for making sodium iodide crystals, among other alkali halide crystals in general. For example, U.S. Pat. No. 5,178,719, discloses a method for controlling residual impurity and dopant concentrations across the length of the crystal. However, most of the quality control solutions for making scintillator crystals have been kept as trade secrets.

Attempts were made in the 1950's to make scintillators from powders. UK Patent No. 792,071 discloses a process to make a transparent scintillation crystal by first compacting the activated powders under a pressure of ~120,000 psi, then heat-treating the compact at a temperature up to the melting point of the crystal, e.g., from 200° C. to 650° C. for sodium iodide. JP Patent Publication No. S48-9272 discloses a process to apply pressure of "several tons per square cm" (1000 $kg/cm^2$=14,223 psi) onto a body containing granular NaI crystals to prepare scintillator of a thickness of about 0.5 mm. Kashyuk et al. disclosed a process to compress alkaline chloride powder at 120° C. and 3000 to 12,000 $kg/cm^2$ (42,670 to 170,680 psi) for 10 minutes to obtain transparent discs.

The prior art methods resulted in crystals of insufficient quality to be used in commercial applications. The invention herein provides a method to supply critically needed cubic halide scintillators of suitable quality.

SUMMARY OF THE INVENTION

A method for making a sintered cubic halide scintillator is provided herein. The method includes pressing a powder mixture of cubic halide and at least one activator under conditions of pressure, temperature, residence time and particle size effective to provide a sintered polycrystalline cubic halide scintillator having a pulse height resolution under 662 keV of from about 7% to about 20%, wherein the processing temperature residence ranges from about ambient temperature up to about 90% of the melting point of the cubic halide in degrees Centigrade, a pressure of from about 30,000 psi to about 200,000 psi, a pressing residence time of from about 5 minutes to about 120 minutes and an average cubic halide particle size from about 60 micrometers to about 2000 micrometers.

Another aspect of the invention is a high energy radiation detector comprising a sintered metal halide scintillator body and a photodetector optically coupled to the scintillator body so as to be capable of producing an electrical signal in response to the emission of a light pulse produced by the scintillator body.

The invention advantageously provides higher throughputs, better yields, reduced scrap, improved mechanical properties, more uniform activator distribution and better control over stoichiometry.

BRIEF DESCRIPTION OF THE DRAWINGS

Various embodiments are described below with reference to the drawings wherein.

DESCRIPTION OF THE INVENTION

As used herein, approximating language including terms such as "about" and "substantially" may be applied to modify any quantitative representation that may vary without resulting in a change in the basic function to which it is related.

As used herein, "scintillator material" may be used interchangeably with "scintillation material," in the singular or plural form, to refer to cubic halide materials for use in radioisotope identification and nuclear applications including, but not limited to, sodium iodide. The scintillator body is the dense mechanically stable piece produced by compaction of the scintillator material.

As used herein, the term "sufficient amount" or "effective amount" means the amount sufficient to bring about the desired effect, e.g., a sufficient pressure or a sufficient temperature for the sintered cubic halide body of the present invention to have measurable optical transmission. All percentages and ratios used herein are by weight of the total composition and all measurements made are at room temperature, unless otherwise designated. Unless otherwise indicated all percentages, ratios and levels of ingredients referred to herein are based on the actual amount of the ingredient, and do not include solvent, fillers or other materials which may be combined with the ingredient in commercially available products.

The method of the invention includes pressing a powder mixture of cubic halide and at least one activator under conditions of pressure, temperature, residence time and particle size effective to provide a sintered polycrystalline cubic halide scintillator having a pulse height resolution under 662 keV of from about 7% to about 20%, preferably from about 7% to about 12%, and more preferably from about 7% to about 10%, wherein the processing temperature ranges from about ambient temperature up to about 90% of the melting point of the cubic halide in degrees Centigrade, a pressure of from about 30,000 psi to about 200,000 psi, a pressing residence time of from about 5 minutes to about 120 minutes and an average cubic halide particle size of from about 60 micrometers to about 2000 micrometers. The pressing is done under conditions sufficient to create a scintillator body of autogenously bonded polycrystalline mass. The conditions are interdependent such that a preferable particle pressure and/or temperature and/or residence time depend upon particle size distribution and/or each other.

Accordingly, in one embodiment of the invention the processing temperature ranges from about 90° C. to about 150° C., the pressure ranges from about 100,000 psi to about 150,000 psi, the residence time ranges from about 5 minutes to about 10 minutes and the average particle size ranges from about 90 micrometers to about 120 micrometers.

In another embodiment of the invention the temperature ranges from about 250° C. to about 450° C., the pressure ranges from about 30,000 psi to about 60,000 psi, the residence time ranges from about 50 minutes to about 60 minutes and the average particle size ranges from about 150 micrometers to about 275 micrometers.

In yet another embodiment of the invention the temperature ranges from about 20° C. to about 30° C., the pressure ranges from about 120,000 psi to about 180,000 psi, the residence time ranges from about 5 minutes to about 10 minutes and the average particle size ranges from about 60 micrometers to about 100 micrometers. The powder mixture can be sintered with or without heating. Moreover, the mixture optionally can be pre-treated to remove moisture and/or other volatile impurities, and post-treated, for example, to anneal the resultant sintered scintillator body.

The scintillator body is fabricated by one of several methods, including uniaxial pressing, and isostatic pressing, which are more fully described below, to provide a sintered body having a density of at least about 90% of theoretical density (i.e., the density of a single crystal). In another embodiment the density is at least about 95% of the theoretical density. And in yet another embodiment the sintered body has a density at least 99% of the theoretical density. Heating can be accomplished by any means suitable for the purposes described herein, such as induction heating, microwave heating, spark plasma sintering (SPS), pulsed electric current sintering (PECS), convection ovens, radiant heaters and the like. The finished scintillator body is comprised of a cubic solid solution of the chemical constituents.

Feed Materials: A preliminary step in the fabrication of the sintered scintillators includes providing a suitable powder containing the desired scintillator material constituents. In one embodiment, the powder comprises cubic halide materials characterized by a high degree of structural symmetry. In an embodiment the cubic halide materials are binary cubic halide materials. Cubic materials are optically isotropic. That is, they have the same refractive index in all directions. In non-cubic ceramics, the scintillated light refracts hundreds of times as it crossed the crystal grain boundaries, resulting in long optical paths and concurrent absorption. The light also impinges frequently on non-perfect reflective channel walls (about 95%) and is decreased about 5% at each such bounce before being detected by the photodiode.

Non-limiting examples of cubic halide materials suitable for use in the invention include alkali metal binary cubic halides such as, for example, NaI, NaBr, KBr, KI, KCl, CsI, CsBr, CsCl, RbI, RbBr, RbCl and RbF. In one embodiment, the cubic halide material comprises NaI. Cubic halides suitable for use in the present invention are commercially available from a number of sources, including Merck, Chemetall, Aldrich, GRIMN, Cerac, Franmar, Fox Chemicals, etc., typically as beads in a size of 10 mesh or 2000 micrometers ($\mu$m).

The cubic halide is admixed with an activator to facilitate fluorescence upon exitation by ionising radiation A preferred activator is thallium, for example, in the form of thallium halide. It is believed that thallium in the crystal lattice acts as an impurity center which may be raised to an excited state either by absorption of photons, by capture of an exciton (defined as an electron hole in the crystal lattice) or by successive capture of an electron and a hole. The importance of thallium as an activator center is that it permits the excited energy to transcend otherwise forbidden energy levels of the crystal to the allowed levels which favour the scintillation process by photon emission during the energy decay to the ground state. Other activators suitable for use in the invention include cesium and sodium.

In one embodiment, a cubic halide powder such as NaI is purified to remove uranium, thorium and radioactive isotopes of potassium, for an purity level of 99.99 to 99.9999% purity. In a second embodiment, the NaI powder is of 99.999% (5N) purity. In a third embodiment, the NaI powder is mixed with thallium iodide as the activator in an amount of up to 0.1% by weight based upon the total mass. In a fourth embodiment, the amount of thallium ranges from 0.005 to 1%. In a fifth embodiment, the amount of thallium ranges from 0.005 to 5%.

In the first step of the method of the invention, a powder containing the desired constituents in the appropriate amounts is prepared. This can be accomplished simply by milling, blending, or grinding a mixture of powders containing the constituents using methods known in the art. Dry milling may also be used for both mixing and break-up of powder aggregates.

Once ground, the precursor powder can be separated using sieves or other means and then classified. In one embodiment, the cubic halide powder is NaI having a specific density of 3.67 g/cm$^3$, with an average primary particle size ranging from <1 micrometer (μm) up to 500 μm (US Sieve 35). In a second embodiment, the NaI powder has an average primary particle size of 50 μm (US Sieve 270) to 300 μm (US Sieve 50). In a third embodiment, the NaI powder has an average primary particle size of 75 μm (US Sieve 200) to 200 μm (US Sieve 70). In a fourth embodiment, an optimum mixture of particles with different mean particle sizes is employed to maximize the packing density and minimize the pore volume, pore size and distribution of the compact to be heat treated.

A feature of the present invention is the ability to tailor the scintillator material in terms of activator concentration and particle size distribution. If desired, the scintillator body can have a substantially uniform concentration of activator throughout the body such that the concentration of activator does not vary by more than about 200%, preferably by no more than 100%, and more preferably by no more than about 50%, across any dimension of the scintillator.

Alternatively, the scintillator can be fabricated with a controlled gradient of the concentration of the activator along one or more dimensions of the scintillator body.

Also, mixtures of different particle size distributions can be employed to provide a scintillator compact body having different crystal properties at different locations. Powder mixtures of predetermined different compositions (e.g., activator percentage composition) and/or different particle size distributions can be loaded at different locations into a die in a preselected order for subsequent sintering as described below. Tailoring the fabrication of the scintillator body in such a manner is a feature of the present invention which cannot be feasibly achieved by single crystal fabrication.

Moreover, the mixture of cubic halide and activator can be composed of two or more blends of cubic halide and activator having different average particle sizes, For example, the mixture can include from about 25% to about 75% of a first blend of cubic halide and activator having a relatively large first cubic halide average particle size, and from about 25% to about 75% of a second blend of cubic halide and activator having a relatively small second cubic halide average particle size of up to about 30% of the first cubic halide average particle size. In an embodiment the first relatively larger cubic halide average particle size ranges from about 200 to about 250 micrometers and the relatively smaller second cubic halide average particle size ranges from about 30 microns to about 50 microns. The advantage of combining blends in such a manner is that the smaller particles tend to fill the interstitial voids of the larger particles, thereby reducing the likelihood of void space in the final sintered scintillator body.

As some starting materials (particularly, NaI) are hygroscopic, mixing of the starting materials in one embodiment is carried out in an inert atmosphere to avoid exposure to air. In yet another embodiment, the powder including optional additives may first be pre-treated prior to fabrication of the ceramic scintillator body as described below.

Optional Pre-Treating: In one embodiment, the powder mixture may be pre-treated by heating to remove moisture and/or other volatile impurities. The pre-treatment is conducted under an inert atmosphere such as nitrogen or noble gas (helium, neon, argon, krypton or xenon), or under a vacuum. NaI, especially, is hygroscopic and should be dried by pre-treatment at a temperature of from about 100° C. to about 200° C. Mixing and mechanical blending and incorporation of the cubic halide (e.g., sodium iodide) and the activator (e.g., thallium iodide) must also be done under an inert atmosphere or vacuum, as well as all further processing and handling.

Uniaxial Pressing (UP): Uni-axial pressing is a standard ceramic fabrication technique used to densify powders into solid parts, wherein pressure is applied in one direction, often with a hydraulic press. The uniaxial pressing can be cold (CUP) or warm uniaxial pressing (WUP), or hot pressing. In WUP, a CUP die is heated before and during the application of pressure.

In one embodiment, the powder may be encapsulated or placed in a sealed container at a pressure between about 10,000 and 100,000 psi, using warm liquids or heated air as the pressurizing medium to increase the density to a closed pore state density at least 93% of the theoretical density. In a second embodiment, the pressure ranges from 30,000 to 60,000 psi. In a third embodiment, the density of the scintillator body is at least 98% of the theoretical density. If any grinding aids or compaction aids (lubricants, such as waxes) have been used, an oxidation treatment to remove all organic additives can be employed prior to sintering.

In one embodiment of a WUP process, the compact is heated in a furnace, e.g., in a graphite or tungsten furnace in a vacuum or a reducing atmosphere such as a wet hydrogen atmosphere, to a temperature of 40° C. to 200° C. In yet another embodiment, the compact is heated to a temperature of 450° C. to 650° C. and at a pressure of 15 to 25,000 psi for a sufficient amount to cause extensive densification and optical clarity development of the sintered crystal. In a third embodiment, the WUP is conducted at a temperature of 150° C. to 300° C. and at a pressure of 150,000 psi.

Hot Pressing: Alternatively, or in combination with any of the previously described process steps, the powder may be hot pressed through the application of external pressure at an elevated temperature. Hot pressing is a compaction process in which a force is applied to a powder or pre-form uni-axially at elevated temperatures, e.g., a temperature over 200° C. Pressures are usually comparatively low compared to cold uni-axial pressing because the addition of heat allows for the same compaction level to be achieved with less force.

In one embodiment, the powder is placed in a suitable die, e.g., a graphite die, and uniaxial pressure is applied on the die while it is being heated by induction heat at a pressure of 10 to 45,000 psi at 100 to 600° C. for a sufficient residence of time until a sintered body having the desired density and optical transparency is obtained, i.e., for a density of at least 93% of the theoretical density. In one embodiment, the sintered body is further processed through another process step, e.g., a HIP process for a density of at least 99.90% of the theoretical density. In one embodiment, the powder compact is hot pressed at 30 to 45,000 psi at 300 to 500° C. for ½ to 6 hours.

In one embodiment, the powder may be vacuum hot pressed to a closed pore state of at least 95% of the theoretical density, and at a temperature ranging from 100° C. of up to 90% of the melting point of the cubic halide. In one embodiment, the powder is encapsulated or placed in a sealed container and hot pressed in a boron nitride coated graphite die at temperatures ranging from 100° C.-600° C. for about 1 hour under a vacuum of about 20 micrometers and a pressure of 1200 psi. The temperature and pressure may then be increased to 500° C. to 600° C. (or to about 90% of the melting point of the scintillator material) at about 5,000 to 25,000 psi, under a vacuum of less than 100 micrometers. These conditions are maintained for about 1 to 4 hours, following which the pressure is released and the resulting scintillator body furnace cooled.

Isostatic Pressing (IP) Isostatic pressing is a process by which a pre-form is submerged in a flexible sheathing in a liquid contained in a pressure vessel. The pressure exerted on the liquid is increased, thus increasing the pressure applied to the product from every direction simultaneously. Pressure is applied all over the parts surface, allowing for complex shapes to be fabricated, and reducing pressure gradients within the part. In this step, the powder compacts or the powder may be encapsulated or placed in a sealed container and isostatically pressed at between about 50,000 and 100,000 psi to increase the density to >93% of the theoretical density. The process can be either cold, warm, or hot isostatic pressing (CIP, WIP, or HIP).

In one embodiment of a WIP process, the powder can be encapsulated or placed in a sealed container and isostatically pressed at between about 10,000 and 100,000 psi, using warm liquids or heated air as the pressurizing medium to increase the density to a value corresponding to closed pore state density (e.g., at least 93% of the theoretical density). In a second embodiment, the pressure ranges from 30,000 to 60,000 psi. In a third embodiment, the density is at least 98% of the theoretical density. If any grinding aids or compaction aids (lubricants, such as waxes) have been used, an oxidation treatment to remove all organic additives can be employed prior to sintering.

Suitable containers for use in the WIP process include flexible air tight containers made out of silicone rubbers, metal, and the like. In one embodiment, the compacts can be heated in a furnace, e.g., in a graphite or tungsten furnace in a vacuum or a reducing atmosphere such as a wet hydrogen atmosphere, to a temperature of 40° C. to 200° C. for a sufficient amount of time to cause extensive densification and optical clarity development of the sintered crystal. In one embodiment, the pressure medium comprises a warm fluid such as hot oil or oil/water mixture, with the scintillator sample contained in a rubber bag. In a second embodiment, wherein a dry bag isopress is used to contain the scintillator sample, heated air is used as the pressure medium. In one embodiment, the warm isostatic pressing is for a period of 1 hour to about 30 hours. In a second embodiment, the warm isostatic pressing is conducted at a pressure of 45,000 psi for a period of 15 hours, and at a furnace temperature of 100° C.

In one embodiment after WIP, the sintered body is further processed through another process step, e.g., a HIP process for a density of at least 99.90% of the theoretical density.

In one embodiment, the hot isostatic pressure is at temperatures between 300 and 600° C. for a sufficient residence of time to obtain the desired optical transparency and density of >99% of the theoretical density.

Optional Post-treating: In this step, the sintered polycrystalline scintillator body has a desired optical transparency, and is heated to a temperature of from about 60% to about 80% of the compacting or sintering temperature (in degrees Centigrade) for about 25% to about 50% of the compacting or sintering residence time to anneal the scintillator body and thereby relax internal mechanical stresses formed during the pressing step. The scintillator body is then allowed to cool to ambient temperature over a period ranging from about 2 to about 6 hours.

Sodium iodide scintillator bodies can become opaque after being exposed to normal air for a short time because of the ambient humidity. As a preventive measure the sintered body can be coated with a thin layer of paraffin oil to prevent moisture from reaching the sodium iodide surface. In all cases, the sintered body should be stored in an airtight environment to prevent the sintered body from deteriorating due to water absorption if exposed to the atmosphere.

Properties of the Sintered Cubic Halide Scintillator Body: The final sintered cubic scintillator body is a near net shape blank having a density of at least 99.9% of the theoretical density. In one embodiment of the invention, the sintered NaI scintillator body is a near net shape blank (4×4×16). In one embodiment, the scintillator body has a density of 3.67 g/cm$^3$, maximum emission in nm of 415, a decay constant of 0.23 ms, a refractive index of 1.85, and a conversion efficiency of 100.

The sintered NaI scintillator body of the invention has no activator segregation and substantially better physical homogeneity as compared to a NaI scintillator single crystal scintillators of the prior art.

Scintillator materials convert the energy deposited by radiation photons into light photons that are afterward detected by photosensors. For detectors capable of energy measurement, the signal from photosensors is amplified and shaped such that each radiation interaction event is recorded as a voltage pulse with an amplitude ("pulse height", or "PH") proportional to the energy deposited by the interaction in the scintillator. The correspondence between the pulse height and the energy of the incident gamma ray is determined for each detector through an energy calibration process. The statistical spread of the pulse amplitude of a multitude of detection events is measured by the detector Pulse Height Resolution (PHR) and determines the capability to distinguish between gamma photons of different energies. PHR is dependent on the characteristic details of the detector system (scintillator+photosensor+electronics), as well as on the energy of the incident radiation photon. The convention widely adopted for gamma radiation detectors is to measure and report the PHR for excitation by 662 keV photons (from 137Cs/137Ba decay) as the ratio of the Full Width at Half Maximum (FWHM) of the total absorption peak and the energy of gamma ray. A sintered NaI scintillator of the invention has a pulse height resolution (PHR) of from about 7% to about 20%, preferably from about 7% to about 12% and more preferably from about 7% to about 10%.

In one embodiment, the sintered sodium iodide scintillator body of the invention operates over the energy range of 100 keV to 3 MeV.

Finishing/Polishing Sintered Scintillator Body: The method of the invention can further include steps of lapping, mechanical polishing, and reducing internal stress of the sintered body by thermal annealing or chemical etching for further enhancement of the surface quality.

Prior to polishing, the sintered body is first sliced into blanks or plates. In lapping operations and for an optimal lapping result, many factors, such as process time, surface finish, and manufacturing cost, have to be considered, and many combinations of abrasive material, particle size, lapping rate, and wafer pressure can be employed. In order to reduce the probability of the sintered body cracking, a pressure below 5 psi, preferably 2 psi, is used. Among various kinds of abrasive materials, such as diamond, silicon carbide, boron carbide, and alumina, diamond slurry is preferred due to its high material removal rate and its production of better surface finishes.

In one embodiment, after lapping, the sintered body can be mechanically polished to achieve smooth surface morphology. During the mechanical polishing process, sintered body is pressed against a polishing pad with abrasive particles. Polishing process typically yields better surface finish than lapping, even for with same sized diamond slurry. Polishing can be achieved either by a single step, or by multiple steps, with each subsequent polishing step using abrasives of progressively smaller particle sizes.

After mechanical polishing, the sintered scintillator body can be cleaned and dried, using techniques known in the art. A mild etching can also be used to remove any remaining surface and subsurface damage from the final polished wafer. The condition for the mild etching is chosen to remove some residual surface damage on the surface from final polishing while not etching, or etching to a limited degree, the undamaged surface.

The sintered cubic halide, e.g., NaI scintillator body of the invention can be used in applications commonly employing the NaI scintillator crystals of the prior art. The flexibility of the process of the invention allows the use of the sintered cubic halide scintillator in applications requiring improved sizes and shapes over the scintillator materials of the prior art.

In one embodiment, a stripped down radiation detector is built using the sintered NaI scintillator of the invention, with a coated scintillator body in a sealed container and coupled to a photomultiplier by a light pipe. The radiation detector can be connected to a number of tools and devices depending on the end-use applications. Examples of end-use applications of the sintered NaI scintillator body of the invention include medical instruments such as NaI(Tl) detectors for radioimmunoassay, NaI(Tl) detectors for bone mass measurements, scintillation cameras (Anger camera plates) for use in nuclear medicine, allowing improved sizes and shapes of SPECT detectors; portal detectors for use in shipping ports, railway stations, border check-points, etc. for detecting illegal transport of radioactive materials; portable hand-held radiation detectors at rail stations, airports, embassies, public buildings such as courthouses, and at public gathering such as sporting events; tunable anti-Stokes Raman laser wherein the scintillator body is used as the lasing medium; scintillation meters for screening/reporting radioactive waste in waste dumps and landfills; NaI(Tl) scintillators in deep well drilling applications; and gamma counter for measuring contamination in food, drinks, including game meat.

Figure 1:
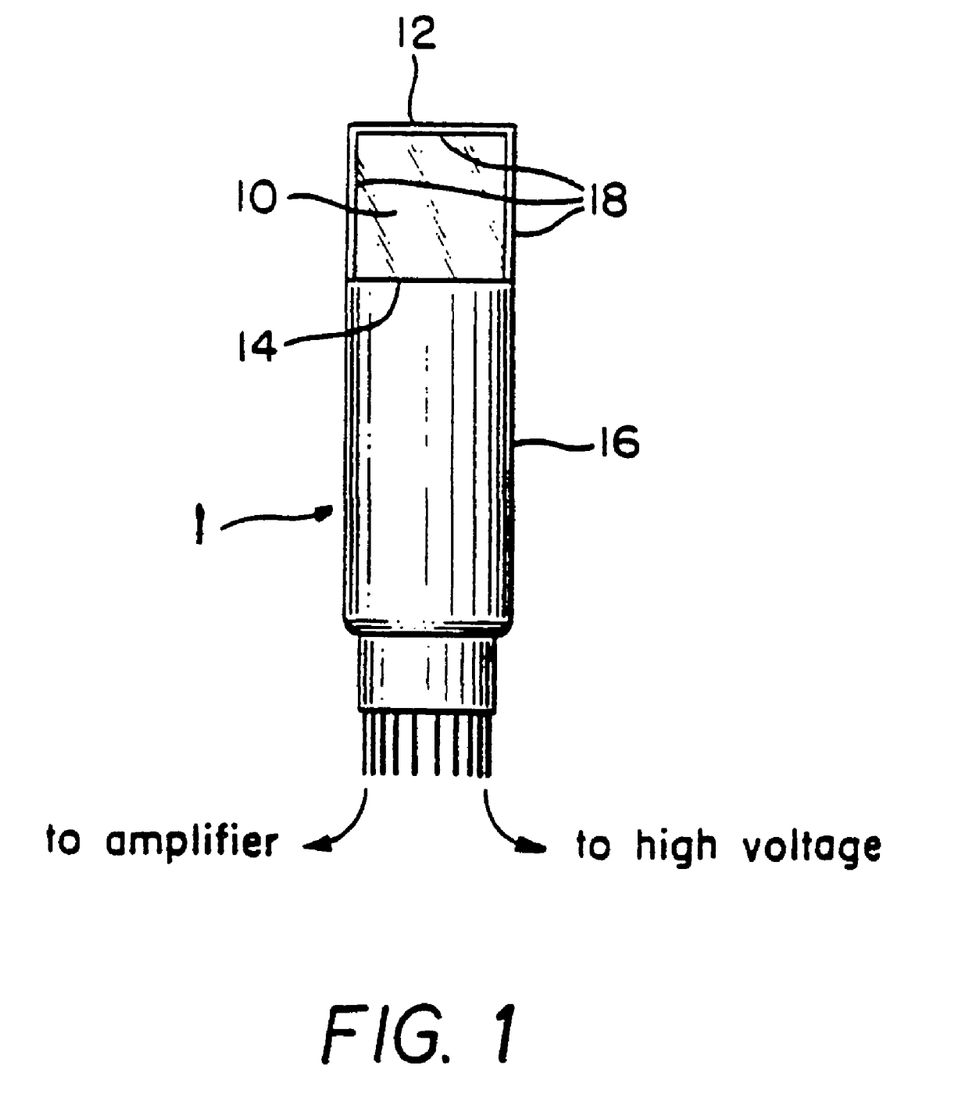
FIG. 1 is a diagrammatic view of a scintillation detector employing the scintillation material of the invention.
Figure 2:
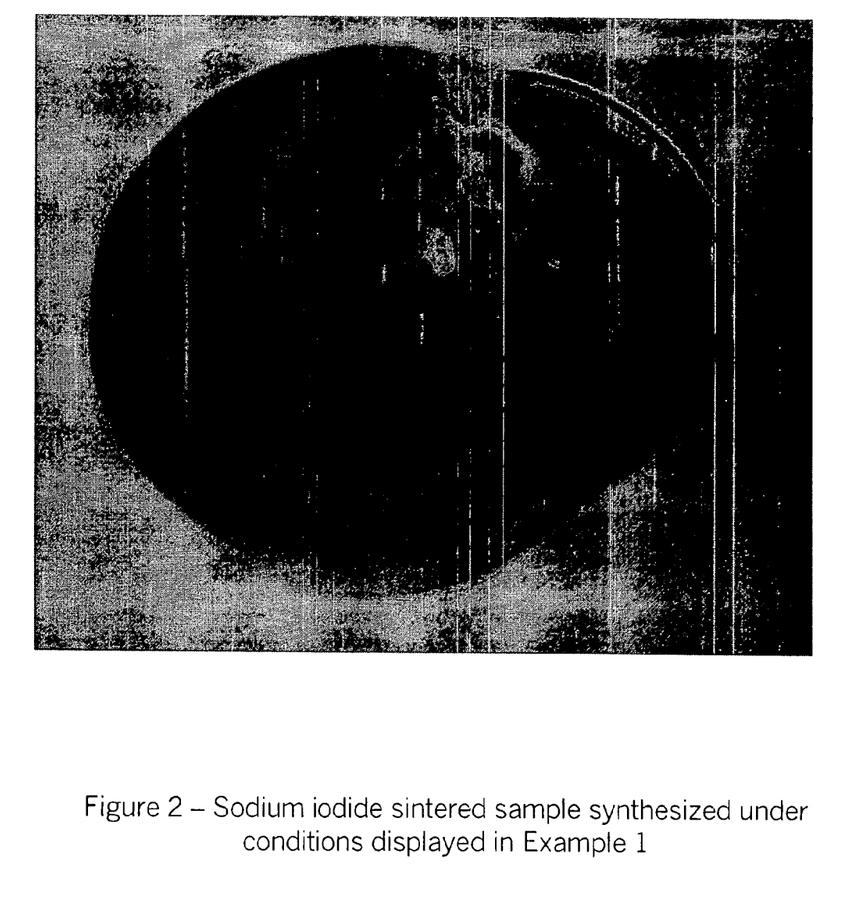
FIGS. 2 to 7 are photographs depicting scintillator bodies produced by the methods set forth in the examples.
Figure 3:
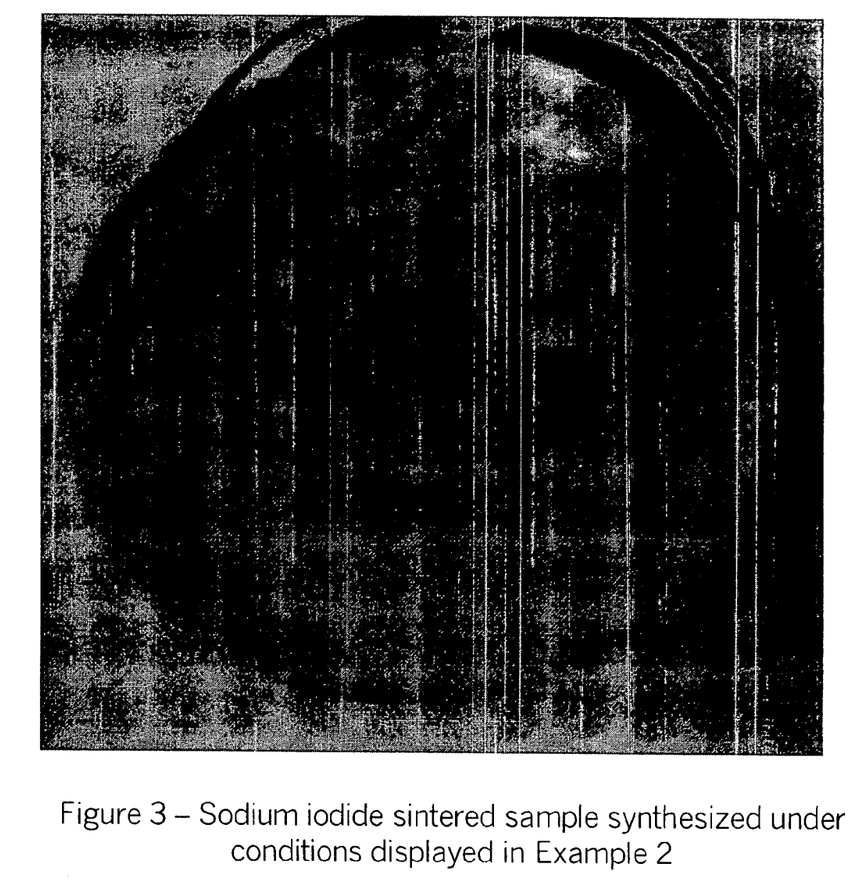
Figure 4:
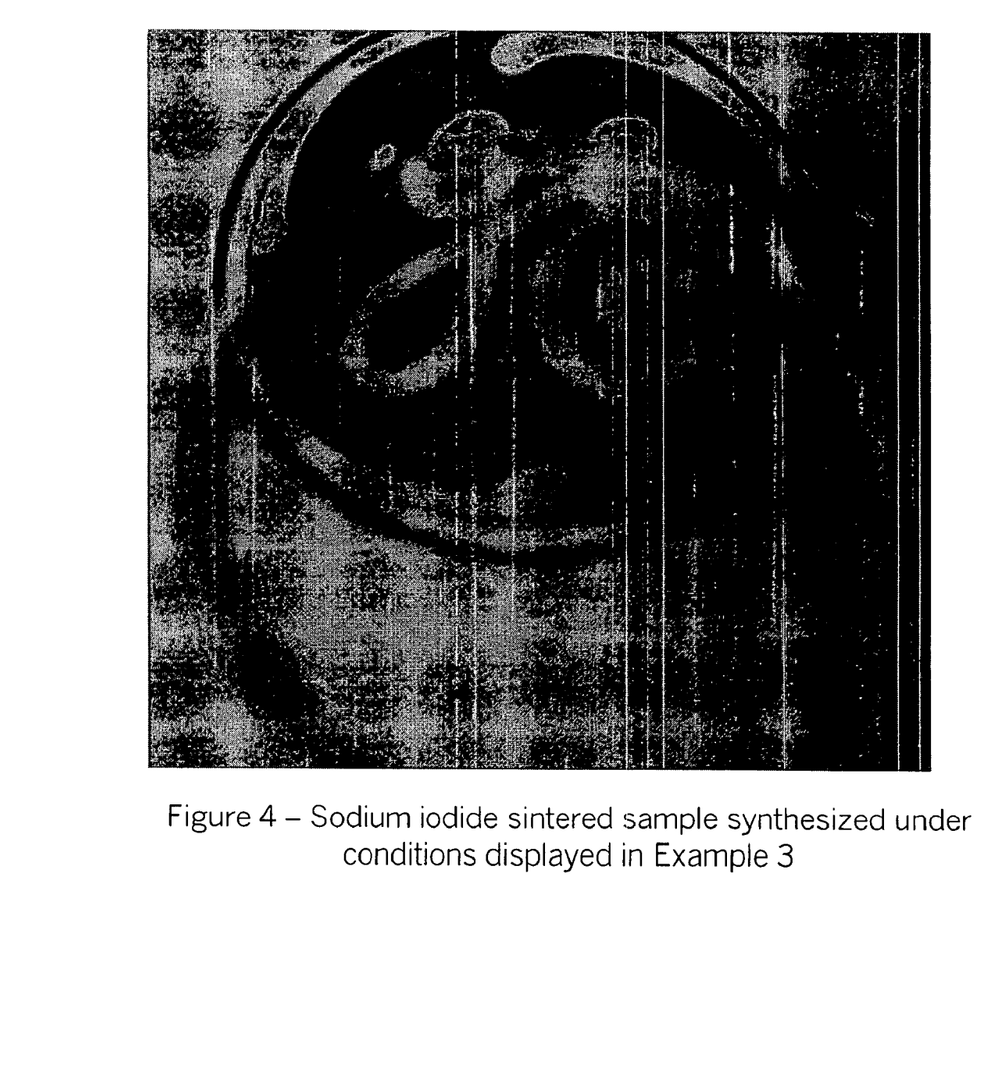
Figure 5:
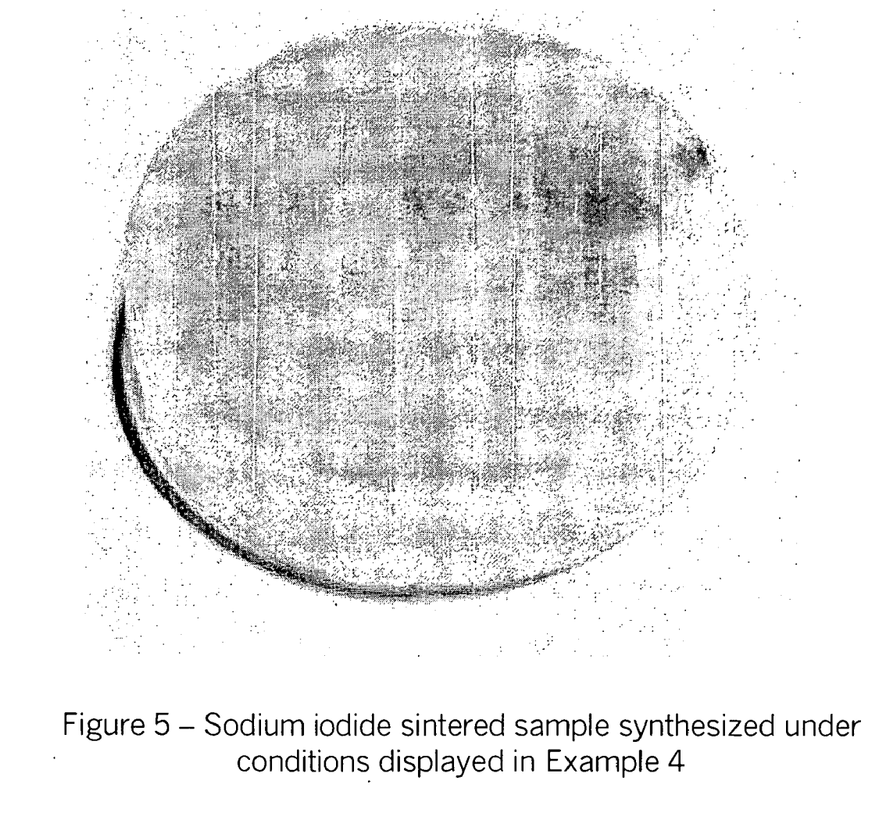
Figure 6:
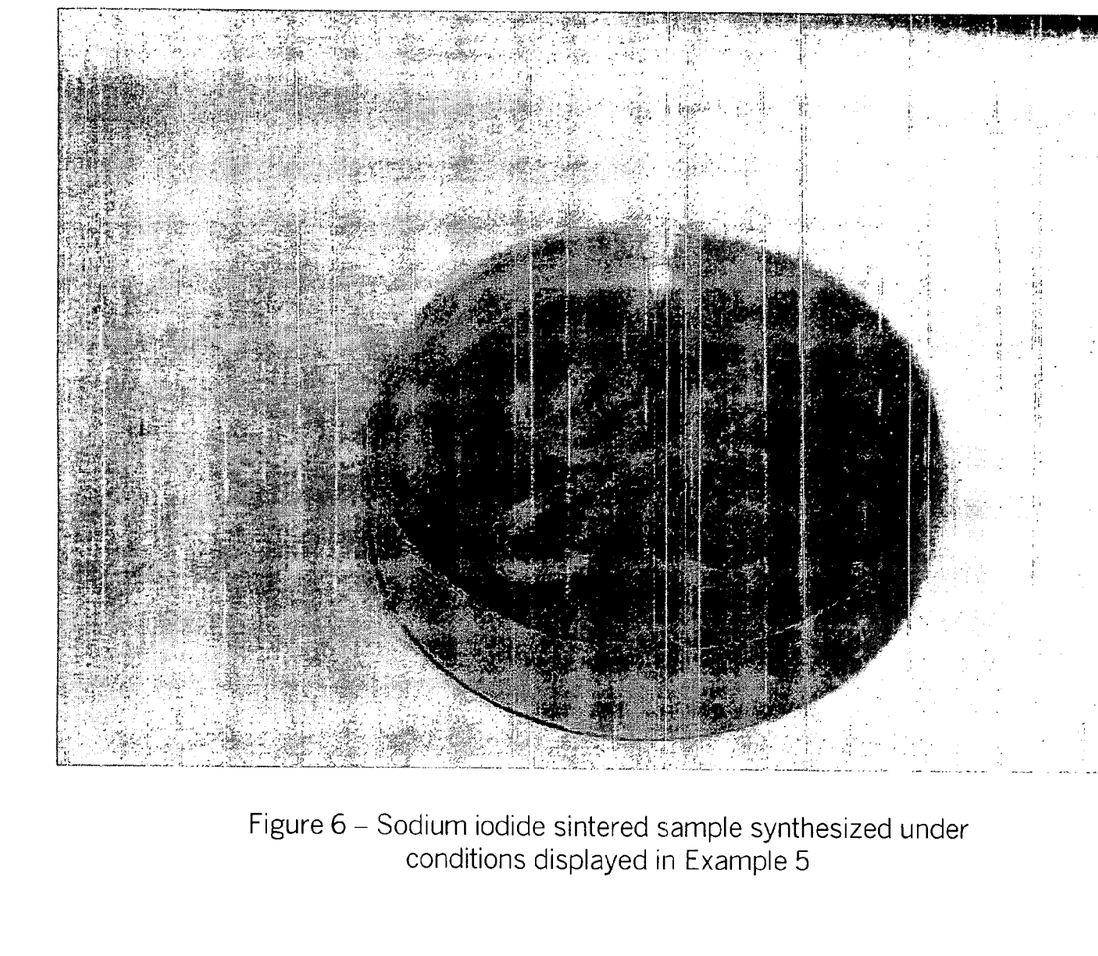

Referring now to FIG. 1, a radiation detector 1 is illustrated which includes a scintillator body 10 comprising the scintillation material of the present invention 10 encased within a housing 12 of the radiation detector. One face 14 of the scintillator body 10 is placed into optical contact with a surface of a photodetector such as photomultiplier tube 16. Alternatively, the light pulses generated by the scintillation material can be coupled to the photomultiplier via light guides, or optical fibers, lenses, and/or mirrors, or the like. The photomultiplier tube 16, can be replaced by any suitable photodetector such as a photodiode, microchannel plate, and the like. In order to direct as much of each light flash to the photodetector 16 as possible, the other faces 18 of the scintillator body 10 preferably can be surrounded or covered by a reflective material such as, for example, aluminium foil, or a coating of magnesium oxide or titanium dioxide. In operation, the scintillator body 10 produces a flash of light when struck by ionizing radiation. The flash is converted by the photodetector into an electrical signal which is then sent to an amplifier for further signal processing.

The invention is further illustrated by the following non-limiting examples:

EXAMPLES 1-5

In these Examples, samples of 20 grams of sodium iodide powder of 99.999% purity obtained from Sigma Aldrich were pre-treated by drying the powder to remove moisture and any volatile impurities and kept under a dry atmosphere throughout the procedure described below. Particle size distributions of the samples are set forth below in Table 1. The samples contained no thallium. The samples were loaded into the die and hot pressed in a vacuum hot press and sintered under pressure in accordance with the following protocol. The samples initially at ambient temperature were heated at a heating ramp rate of 6.6° C./minute to a processing first temperature of 300° C. and held at the first temperature for a first residence time as indicated in Table 1. Then the samples were allowed to cool at a cooling ramp rate of 4° C./minute to a second temperature of 240° C. for annealing and held at the second temperature for a second residence time of 15 minutes. Finally, the samples were allowed to cool at a cooling ramp rate of 6.6° C./minute back down to ambient temperature. Pressure was applied during the last 15 minutes of the initial heating up to a sintering pressure as indicated in Table 1 and maintained during the first temperature and residence time conditions, after which the pressure was reduced to ambient. The resulting scintillator bodies were visually assessed for optical transparency and color, the results being set forth below in Table 1. Photographs of the resulting scintillator bodies of Examples 1-5 are presented in FIGS. 2 to 6, respectively, as indicated in Table 1.

TABLE 1

| Example (Fig.) | Particle Size Distribution | Pressure (psi) | Residence Time, (min.) | Temp. | Optical Transparency | Color |
|---|---|---|---|---|---|---|
| 1 (FIG. 2) | −140/+170 Sieve | 45,000 | 30 | 300° C. | Transparent | Yellow |
| 2 (FIG. 3) | −60/+100 Sieve | 45,000 | 60 | 300° C. | Translucent | Pure white |
| 3 (FIG. 4) | −60/+100 Sieve | 45,000 | 22 | 300° C. | Transparent | Pure white |
| 4 (FIG. 5) | −50/+60 Sieve | 50,000 | 15 | 300° C. | Opaque | Pure White |
| 5 (FIG. 6) | −60/+70 Sieve | 50,000 | 15 | 300° C. | Transparent | Pure White |

EXAMPLE 6

Figure 7:
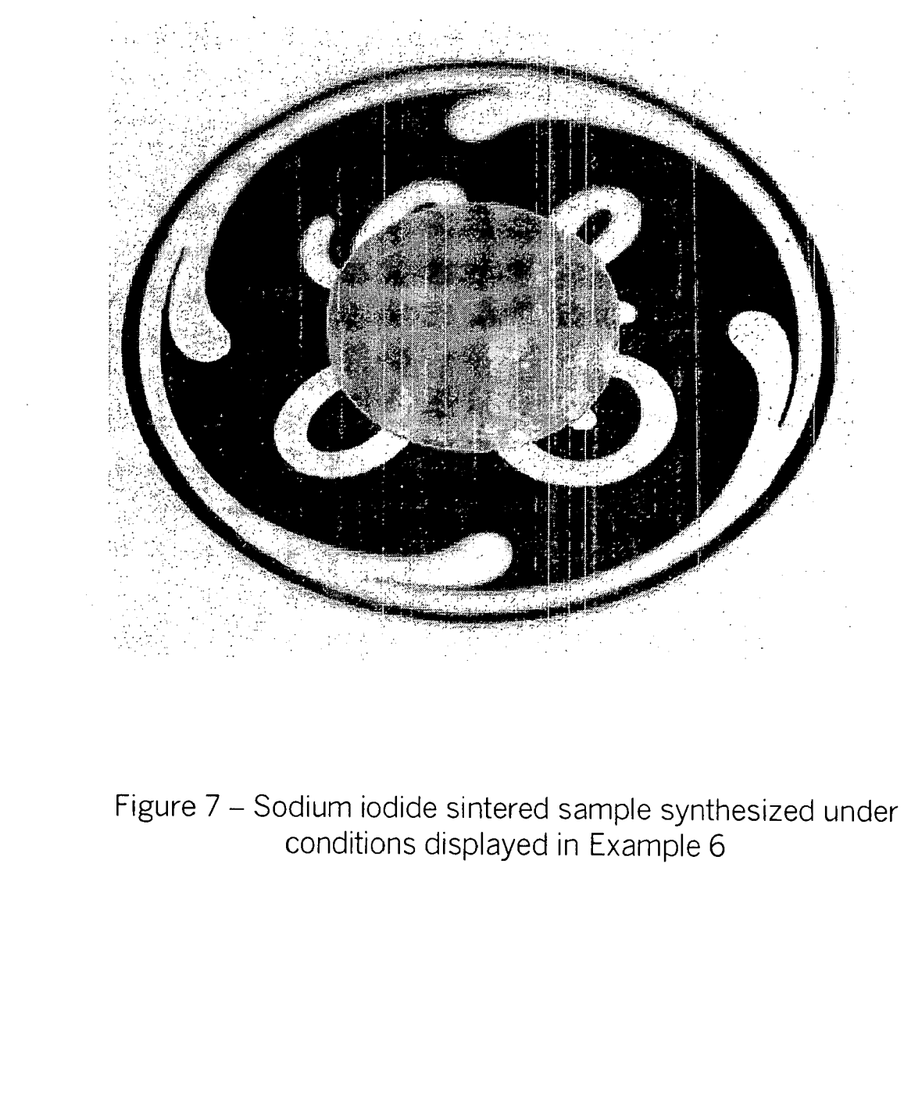

In this example 20 grams of sodium iodide containing 0.2% thallium iodide and having a particle size of from about 10 micrometers to about 592 micrometers were cold pressed at ambient temperature and 110,000 psi for 5 minutes. The resulting scintillator body is shown in FIG. 7 and was translucent yellow.

These Examples show that for sintered specimens using particles collected between −60+70 Sieves, and processing conditions described in Example 1, the samples were transparent and yellow instead of the transparent pure white appearance characteristic of pure sodium iodide.

Comparing Examples 2 and 3 (i.e., similar particle size distribution, pressure and residence temperature), it can be seen that there was a significant improvement in optical clarity by reducing the residence time from 60 minutes, wherein the samples were translucent pure white, to 22 minutes, wherein the samples were transparent pure white.

Comparing Examples 4 and 5, synthesized under the same processing conditions but different particle size distributions, the sintered specimens were opaque for powders collected within −60/+60 Sieve range, but transparent for powders collected within the −60/+70 Sieve range.

The data show that using the appropriate combination of processing conditions (particle size distribution, residence temperature, residence time, and applied pressure) is necessary for obtaining desirable transparent pure white scintillator bodies.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

All citations referred herein are expressly incorporated herein by reference.

What is claimed is:

1. A method for making a sintered cubic halide scintillator comprising:

pressing a powder mixture of cubic halide and at least one activator under processing conditions of pressure, temperature, residence time and particle size effective to provide a polycrystalline sintered cubic halide scintillator having a pulse height resolution at 662 keV of from about 7% to about 20%, wherein the processing temperature ranges from about ambient temperature up to about 90% of the melting point of the cubic halide in degrees Centigrade, a pressure of from about 30,000 psi to about 200,000 psi, a pressing residence time of from about 5 minutes to about 120 minutes and an average cubic halide particle size of from about 60 micrometers to about 2000 micrometers.

2. The method of claim 1 wherein the cubic halide is a binary cubic halide selected from halides of sodium, potassium, cesium and rubidium.

3. The method of claim 1 wherein the cubic halide is sodium iodide.

4. The method of claim 1 wherein the activator is selected from halides of thallium, cesium and sodium.

5. The method of claim 1 wherein the activator is thallium iodide.

6. The method of claim 1 wherein the activator concentration ranges from about 0.005% to 5.0% by weight.

7. The method of claim 1 wherein the processing temperature ranges from about 20° C. to about 30° C., the pressure ranges from about 100,000 psi to about 200,000 psi, the residence time ranges from about 5 minutes to about 10 minutes and the average particle size ranges from about 60 micrometers to about 90 micrometers.

8. The method of claim 1 wherein the temperature ranges from about 90° C. to about 150° C., the pressure ranges from about 100,000 psi to about 150,000 psi, the residence time ranges from about 5 minutes to about 10 minutes and the average particle size ranges from about 90 micrometers to about 120 micrometers.

9. The method of claim 1 wherein the temperature ranges from about 250° C. to about 450° C., the pressure ranges from about 30,000 psi to about 60,000 psi, the residence time ranges from about 50 minutes to about 60 minutes and the average particle size ranges from about 200 micrometers to about 275 micrometers.

10. The method of claim 1 wherein the pressing is accomplished by cold, warm or hot uniaxial pressing.

11. The method of claim 10 wherein the uniaxial pressing is hot pressing.

12. The method of claim 1 wherein the pressing is accomplished by cold, warm or hot isostatic pressing.

13. The method of claim 1 wherein the activator is substantially uniformly distributed throughout the mixture.

14. The method of claim 1 wherein the activator has a concentration percentage which varies throughout the mixture in accordance with a controlled gradient.

15. The method of claim 1 wherein the mixture comprises at least first and second blends having first and second different activator concentrations and/or first and second different particle size range distributions and said first and second blends are loaded into a compression die in a preselected order for subsequent sintering to provide a scintillator body having a controlled gradient of activator concentration and/or crystal size along a dimension of the scintillator.

16. The method of claim 1 wherein the mixture can include from 25% to about 75% of a first blend of cubic halide and activator having a relatively large first cubic halide average particle size, and from about 25% to about 75% of a second blend of cubic halide and activator having a relatively small second cubic halide average particle size of up to about 30% of the first cubic halide average particle size.

17. The method of claim 16 wherein the relatively large first cubic halide average particle size ranges from about 200 micrometers to about 250 micrometers, and the second relatively small average cubic halide particle size ranges from about 30 micrometers to about 50 micrometers.

18. The method of claim 1 further including pre-treating the mixture prior to pressing to remove moisture and/or other volatile impurities.

19. The method of claim 18 wherein the pre-treating is accomplished by preheating the mixture under an inert atmosphere or vacuum.

20. The method of claim 1 further including annealing the polycrystalline sintered cubic halide scintillator at a temperature sufficient to reduce internal mechanical stresses in the scintillator.

* * * * *